United States Patent
Li et al.

(10) Patent No.: US 10,419,804 B2
(45) Date of Patent: Sep. 17, 2019

(54) COOPERATIVE PROVISION OF PERSONALIZED USER FUNCTIONS USING SHARED AND PERSONAL DEVICES

(71) Applicant: Intel Corporation, Santa Clara, CA (US)

(72) Inventors: Wenlong Li, Beijing (CN); Honesty Young, Chicago, IL (US); Randolph Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/681,145

(22) Filed: Aug. 18, 2017

(65) Prior Publication Data

US 2017/0374404 A1 Dec. 28, 2017

Related U.S. Application Data

(63) Continuation of application No. 15/605,632, filed on May 25, 2017, now abandoned, which is a
(Continued)

(51) Int. Cl.
*H04N 21/41* (2011.01)
*H04N 21/485* (2011.01)
(Continued)

(52) U.S. Cl.
CPC ....... *H04N 21/4126* (2013.01); *H04L 65/403* (2013.01); *H04N 21/4223* (2013.01);
(Continued)

(58) Field of Classification Search
CPC ........... H04N 21/4223; H04N 21/4316; H04N 21/478; H04N 21/4126; H04N 21/44008;
(Continued)

(56) References Cited

U.S. PATENT DOCUMENTS 8,751,957 B1 * 6/2014 Trajkovic ........... G06K 9/00335
   715/716
9,014,685 B2    4/2015 Bathiche
(Continued)

FOREIGN PATENT DOCUMENTS

CN    101496404    7/2009
CN    101815162    8/2010
(Continued)

OTHER PUBLICATIONS

Office Action dated Sep. 12, 2017 in U.S. Appl. No. 15/605,632, and related attachments.
(Continued)

*Primary Examiner* — Shean Tokuta
*Assistant Examiner* — Juan C Turriate Gastulo
(74) *Attorney, Agent, or Firm* — Christopher K. Gagne (57) ABSTRACT

Methods, apparatuses and storage medium associated with cooperative provision of personalized user functions using shared device and personal device are disclosed herein. In various embodiments, a personal device (PD) method may include receiving, by a personal device of a user, a request to perform a user function to be cooperatively provided by the personal device and a shared device (SD) configured for use by multiple users; and cooperating with the shared device, by the personal device, to provide the requested user function personalized to the user of the personal device. In various embodiments, a SD method may include similar receiving and cooperating operations, performed by the SD. Other embodiments may be disclosed or claimed.

20 Claims, 7 Drawing Sheets

Related U.S. Application Data continuation of application No. 13/995,488, filed as application No. PCT/CN2011/001550 on Sep. 12, 2011, now abandoned.

(51) Int. Cl.

| | | |
|---|---|---|
| *H04N 21/4223* | (2011.01) | |
| *H04N 21/431* | (2011.01) | |
| *H04N 21/44* | (2011.01) | |
| *H04N 21/472* | (2011.01) | |
| *H04N 21/478* | (2011.01) | |
| *H04L 29/06* | (2006.01) | |

(52) U.S. Cl.
CPC ... *H04N 21/4316* (2013.01); *H04N 21/44008* (2013.01); *H04N 21/478* (2013.01); *H04N 21/47217* (2013.01); *H04N 21/4854* (2013.01); *H04N 21/4858* (2013.01)

(58) Field of Classification Search
CPC .......... H04N 21/47217; H04N 21/4854; H04L 65/403
See application file for complete search history.

(56) References Cited

U.S. PATENT DOCUMENTS

| | | | |
|---|---|---|---|
| 2003/0001908 A1 | 1/2003 | Cohen-Solal | |
| 2006/0158307 A1 | 7/2006 | Lee | |
| 2007/0027764 A1 | 2/2007 | Masuo | |
| 2007/0096283 A1 | 5/2007 | Ljung | |
| 2007/0198532 A1 | 8/2007 | Krikorian | |
| 2007/0283296 A1 | 12/2007 | Nilsson | |
| 2008/0066181 A1 | 3/2008 | Haveson | |
| 2008/0109843 A1 | 5/2008 | Ullah | |
| 2008/0231545 A1 | 9/2008 | Gong | |
| 2008/0295012 A1 | 11/2008 | Sloo | |
| 2008/0320546 A1 | 12/2008 | Moon | |
| 2009/0133090 A1* | 5/2009 | Busse | H04N 7/163 725/132 |
| 2009/0138805 A1 | 5/2009 | Hildreth | |
| 2009/0150553 A1 | 6/2009 | Collart | |
| 2009/0288132 A1 | 11/2009 | Hegde | |
| 2009/0298535 A1 | 12/2009 | Klein | |
| 2009/0320070 A1 | 12/2009 | Inoguchi | |
| 2010/0081375 A1 | 4/2010 | Rosenblatt | |
| 2010/0186046 A1 | 7/2010 | Bae | |
| 2010/0188579 A1* | 7/2010 | Friedman | H04N 5/45 348/565 |
| 2010/0205628 A1 | 8/2010 | Davis | |
| 2010/0216441 A1 | 8/2010 | Larsson | |
| 2011/0065459 A1 | 3/2011 | Cheng | |
| 2011/0107388 A1 | 5/2011 | Lee | |
| 2011/0115877 A1 | 5/2011 | Kang | |
| 2011/0119406 A1 | 5/2011 | Chang | |
| 2011/0185437 A1 | 7/2011 | Tran et al. | |
| 2011/0281566 A1* | 11/2011 | Davis | H04M 1/72533 455/414.1 |
| 2011/0289535 A1* | 11/2011 | Saffari | H04N 21/235 725/61 |
| 2012/0064887 A1* | 3/2012 | Shobatake | H04L 12/2812 455/432.1 |
| 2012/0078725 A1 | 3/2012 | Maitra | |
| 2012/0262370 A1 | 10/2012 | Ko | |
| 2014/0032722 A1 | 1/2014 | Snow | |
| 2014/0189042 A1* | 7/2014 | Chen | H04N 21/4756 709/213 |

FOREIGN PATENT DOCUMENTS

| | | |
|---|---|---|
| CN | 101877724 | 11/2010 |
| CN | 101931629 | 12/2010 |
| CN | 101946267 | 1/2011 |
| CN | 102065335 | 5/2011 |
| CN | 102075728 | 5/2011 |
| CN | 102098280 | 6/2011 |
| CN | 102098564 | 6/2011 |
| CN | 201180073398.6 | 4/2018 |
| EP | 2328345 | 6/2011 |
| GB | 2460219 | 11/2009 |
| JP | H11196345 | 7/1999 |
| JP | 2001036891 | 2/2001 |
| JP | 2007013364 | 1/2007 |
| JP | 2008526103 | 7/2008 |
| JP | 2010520538 | 6/2010 |
| KR | 10-2005-0083515 | 8/2005 |
| KR | 10-2006-0082923 | 7/2006 |
| KR | 20090051181 | 5/2009 |
| KR | 10-1828889 | 2/2018 |
| KR | 10-1942211 | 1/2019 |
| TW | 200826631 | 6/2008 |
| TW | 201019723 | 5/2010 |
| WO | 2002/42909 | 5/2002 |
| WO | 2002041107 | 5/2002 |
| WO | 2007119236 | 10/2007 |
| WO | 2008016031 | 2/2008 |
| WO | 2010/093510 | 8/2010 |
| WO | 2010093510 | 8/2010 |
| WO | 2013037084 | 3/2013 |

OTHER PUBLICATIONS

Search Report dated Jun. 28, 2012 in PCT Application PCT/CN2011/001550.
Written Opinion dated Jun. 28, 2012 in PCT Application PCT/CN2011/001550.
International Preliminary Examination Report dated Mar. 12, 2014 in PCT Application PCT/CN2011/001550.
Office Action dated Mar. 9, 2017 in U.S. Appl. No. 13/995,488, and related attachments.
Office Action dated Aug. 18, 2016 in U.S. Appl. No. 13/995,488, and related attachments.
Advisory Action dated Jun. 16, 2016 in U.S. Appl. No. 13/995,488, and related attachments.
Office Action dated May 12, 2016 in U.S. Appl. No. 13/995,488, and related attachments.
Office Action dated Mar. 21, 2016 in U.S. Appl. No. 13/995,488, and related attachments.
Office Action dated Nov. 20, 2015 in U.S. Appl. No. 13/995,488, and related attachments.
Office Action dated Oct. 15, 2015 in U.S. Appl. No. 13/995,488, and related attachments.
Office Action dated Sep. 21, 2015 in U.S. Appl. No. 13/995,488, and related attachments.
Office Action dated Aug. 26, 2015 in U.S. Appl. No. 13/995,488, and related attachments.
Office Action dated Jun. 3, 2015 in U.S. Appl. No. 13/995,488, and related attachments.
Office Action dated Feb. 20,2017 in European Patent Application 11872364.2.
Partial summarized English translation of Office Action dated Feb. 3, 2017 in Chinese Patent Application 201180073398.6.
Office Action dated Jul. 5, 2016 in Chinese Patent Application 201180073398.6, with partial summarized English translation thereof.
Office Action dated Jun. 16, 2016 in European Patent Application 11872364.2.
Office Action dated Jun. 12, 2015 in European Patent Application 11872364.2.
Office Action dated Mar. 17, 2015 in Japanese Patent Application 2014-528823, with partial summarized organized English translation thereof.
Office Action dated Mar. 20, 2015 in Korean Patent Application 10-2014-7006559, with partial summarized English translation thereof.
Office Action dated Feb. 9, 2015 in European Patent Application 11872364.2.
Office Action dated Feb. 25, 2015 in Taiwanese Patent Application 101131834, with partial summarized English translation thereof.

(56) References Cited

OTHER PUBLICATIONS

Office Action dated Sep. 10, 2014 in Taiwanese Patent Application 101131834, with partial summarized English translation thereof.
Office Action dated Jul. 6, 2017 in Taiwanese Patent Application 101131834, with partial summarized English translation thereof.
Partial summarized English translation of Office Action dated Mar. 31, 2017 in Chinese Patent Application 201180073398.6.
Office Action dated Sep. 18, 2017 in Chinese Patent Application 201180073398.6.
Office Action dated Sep. 30, 2015 in Korean Patent Application 10-2014-7006559.
Office Action dated Apr. 21, 2016 in Korean Patent Application 10-2014-7006559.
Office Action dated Jun. 7, 2016 in Korean Patent Application 10-2015-7013298.
Office Action dated Jan. 26, 2018 in U.S. Appl. No. 15/605,632, and related attachments.
Intention to Grant in EP Application No. 11872364.2 dated Nov. 7, 2017, and related attachments.
Office Action dated Nov. 30, 2017 in U.S. Appl. No. 15/605,632, and related attachments.
Office Action dated Oct. 19, 2017 in U.S. Appl. No. 15/681,145, and related attachments.
Office Action dated Sep. 18, 2017 in Chinese Patent Application No. 201180073398.6, and summarized partial English translation.
Notification to Grant Patent Right for Invention dated Dec. 20, 2017 in Chinese Patent Application No. 201180073398.6, related attachments, and summarized partial English translation.
Allowance Decision of Re-examination dated Oct. 24, 2017 in Taiwanese Patent Application No. 101131834.
Notice of Allowance dated Nov. 6, 2017 in Korean Patent Application No. 10-2017-7014277.
Office Action dated Apr. 18, 2018 in U.S. Appl. No. 15/681,145, and related attachments.
Office Action dated May 2, 2018 in EPO Application No. 11872364.2.
Office Action dated May 3, 2018 in EPO Application No. 17201028.2, and related attachments.
Allowance Decision dated Apr. 26, 2018 in Taiwanese Patent Application No. 106119341.
Extended European Search Report dated Jun. 7, 2018 in EPO Application No. 18153387.8.
Office Action dated Apr. 27, 2018 in Korean Patent Application No. 10-2017-7025266, and partial summarized English translation.
Allowance Decision dated Mar. 20, 2018 in Taiwanese Patent Application No. 106128286.
Office Action dated Jul. 12, 2018 in U.S. Appl. No. 15/605,632, and related attachments.
Intention to Grant dated Dec. 19, 2018 in EP Application No. 11872364.2, and related attachments.
Letters Patent dated Jan. 18, 2019 in Korean Patent No. 10-1942211, and partial summarized English translation.
Notice of Allowance dated Oct. 18, 2018 in Korean Patent Application 10-2017-7025266.
Office Action dated Apr. 11, 2019 in European Patent Application No. 17201028.2.
Office Action dated Jun. 7, 2019 in European Patent Application No. 18153387.8.
Office Action dated Jul. 25, 2019 in Chinese Patent Application No. 201710712717, and attached search report.

\* cited by examiner

Computer-readable storage medium
802

Programming Instructions 804
Configured to enable a SD 102 and/or PD 112, in response to corresponding execution of the programming instructions by SD 102 or PD 112, to respectively perform the SD or PD part of the Method of Figures 3-4.

COOPERATIVE PROVISION OF PERSONALIZED USER FUNCTIONS USING SHARED AND PERSONAL DEVICES

RELATED APPLICATION

The present application is a continuation of U.S. patent application Ser. No. 13/995,488, which is a national phase entry under 35 U.S.C. § 371 of International Application No. PCT/CN2011/001550, filed Sep. 12, 2011, entitled "COOPERATIVE PROVISION OF PERSONALIZED USER FUNCTIONS USING SHARED AND PERSONAL DEVICES", which designated, among the various States, the United States of America. The Specifications of the U.S. patent application Ser. No. 13/995,488 and PCT/CN2011/001550 application are hereby incorporated by reference.

The subject matter of this and the parent PCT application is related to:
   (1) International Application No. PCT/CN2011/001549, titled Personalized Video Content Consumption Using Shared Video Device and Personal Device, and
   (2) International Application No. PCT/CN2011/001546, titled Annotation and/or Recommendation of Video Content Method and Apparatus.

Both contemporaneously filed with the grandparent PCT application PCT/CN2011/001550.

TECHNICAL FIELD

This application relates to the technical fields of data processing, more specifically to methods and apparatuses associated with cooperative provision of personalized user functions using shared and personal devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuit, computing, networking and other technologies, personal devices configured for use by a user, such as smartphones, tablet computers, and so forth, are increasingly popular. Concurrently, shared devices configured for use by multiple users, such as televisions, or set-top boxes coupled to television remain popular, in part, because of their increased functionalities, such as high-definition video, surround sound, and so forth. Currently, except perhaps for the use of a personal device as a conventional remote control to a shared device, there is little integration or cooperation between personal and shared devices.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Methods, apparatuses and storage medium associated with cooperative provision of personalized user functions using shared and personal devices are disclosed herein. In various embodiments, a personal device (PD) method may include receiving, by a personal device of a user, a request to perform a user function to be cooperatively provided by the personal device and a shared device configured for use by multiple users; and cooperating with the shared device, by the personal device, to provide the requested user function personalized to the user of the personal device.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "smartphone" as used herein, including the claims, refers to a "mobile phone" with rich functionalities beyond mobile telephony, such as, personal digital assistant (PDA), media player, cameras, touch screen, web browsers, Global Positioning System (GPS) navigation, WiFi, mobile broadband, and so forth. The term "mobile phone" or variants thereof, including the claims, refers to mobile electronic device used to make mobile telephone calls across a wide geographic area, served by many public cells.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "a selected one of A or B," as used herein refers to "A" or "B," and does not in any way imply or require a "selection" operation to be performed.

Figure 1:
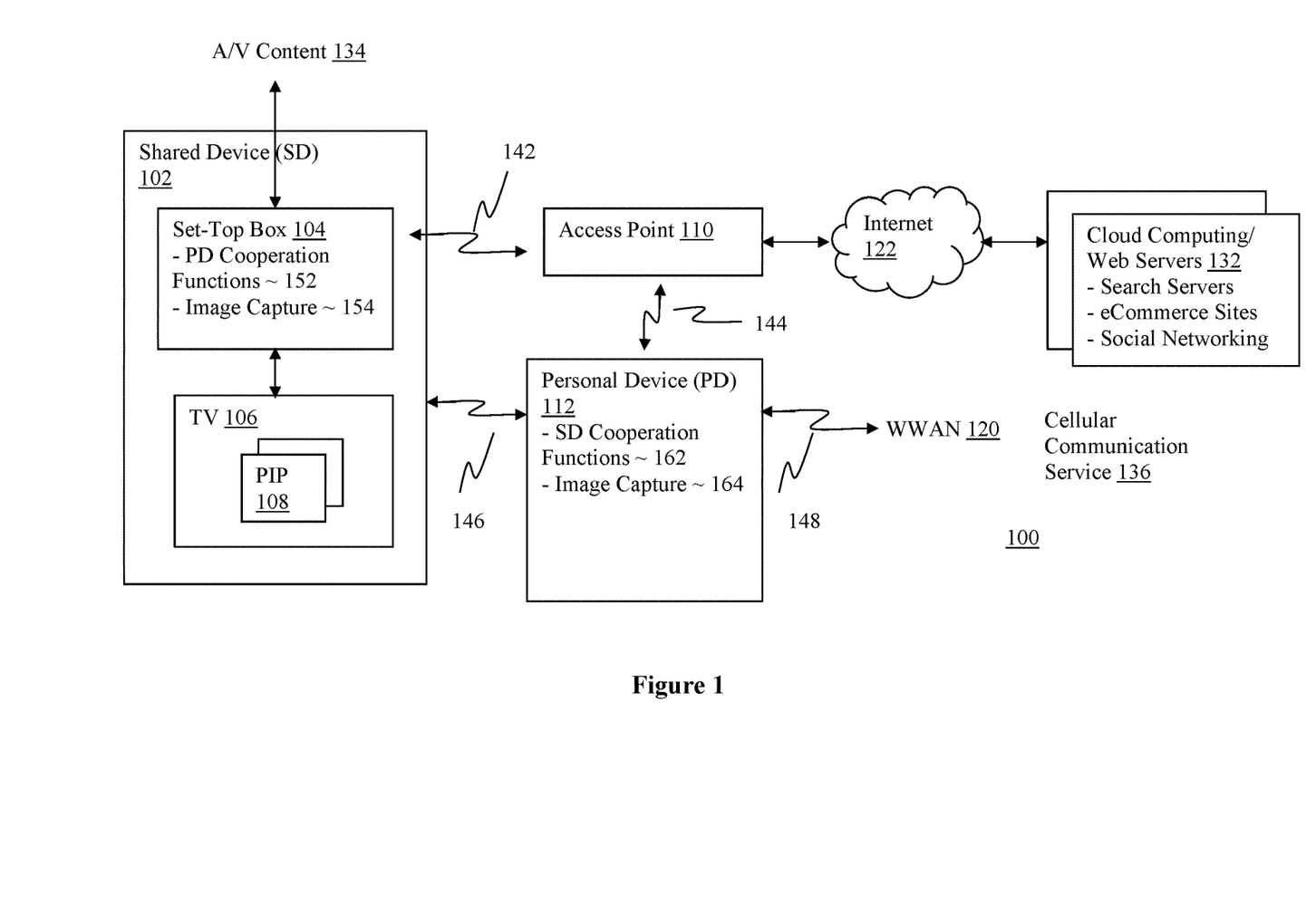
FIG. 1 is a block diagram illustrating an example shared and personal devices usage arrangement.

Referring now to FIG. 1, wherein a block diagram illustrating an example shared and personal devices usage arrangement, in accordance with various embodiments. As illustrated, arrangement 100 may include shared device (SD) 102 configured to provide a user function for use by multiple users, e.g., receive and render audio/visual (A/V) content 134, and personal device (PD) 112 configured to provide various personal functions, such as mobile telephony, for use by a user. Further, SD 102 and PD 112 may be respectively configured with PD cooperation functions 152 and SD cooperation functions 162, to cooperate with each other to provide personalized user functions, to be described more fully below. Except for PD and SD cooperation functions 152 and 162 provided in accordance with embodiments of the present disclosure, examples of SD 102 may include a multiple device coupled combination of television 106 and set-top box 104, or a single device integrated combination of television 106 and set-top box 104, whereas, examples of PD 112 may include a smartphone or a tablet computer. In various embodiments, television 106 may include a picture-in-picture (PIP) feature with one or more PIP 108, and set-top box 104 may include a digital image capture device 154, such as a camera. Likewise, PD 112 may also include a digital image capture device 164, such as a camera.

As illustrated, SD 102 may be configured to be coupled to, and selectively receive A/V content 134 from one or more A/V content sources (not shown), whereas PD 112 may be configured to be wirelessly 148 coupled to cellular communication service 136, via wireless wide area network (WWAN) 120. Examples of A/V content sources may include, but are not limited to, television programming broadcasters, cable operators, satellite television programming providers, digital video recorders (DVR), compact disc (CD) or digital video disc (DVD) players, or video cassette recorders (VCRs). Cellular communication service 136 may be Code Division Multiple Access (CDMA) service, Enhanced GPRS (EDGE) service, 3G or 4G service (GPRS=General Packet Radio Service).

Still referring to FIG. 1, in various embodiments, SD 102 and PD 112 may be wirelessly 142 and 144 coupled with each other, via access point 110. In turn, access point 110 may further couple SD 102 and PD 112 to remote cloud computing/web servers 132, via one or more private or public networks, including e.g., the Internet 122. In other words, SD 102, PD 112 and access point 110 may form a local area network, such as a home network. Remote cloud computing/web servers 132 may include search services, such as Google® or Bing®, eCommerce sites, such as Amazon®, or social networking sites, such as Facebook® or MySpace®. Further, in various embodiments, SD 102 and PD 112 may be respectively configured to enable the devices to be wirelessly 146 coupled using personal and/or near field communication protocols. In various embodiments, wireless couplings 142 and 144 may include WiFi connections, whereas wireless coupling 146 may include a Bluetooth connection. In various embodiments, PD cooperation functions 152 and SVD cooperation functions 162 may communicate with each other in accordance with the Transmission Control Protocol (TCP), User Diagram Protocol or other message protocols.

In various embodiments, SD 102 and PD 112 may have respectively associated identifiers. For the embodiments, where SD 102 includes television 106 with PIP 108, SD 102 may further include logical identifiers respectively identifying the main picture and the PIP 108. Additionally, in various embodiments, the identifiers may be respectively included in at least discovery communications transmitted by SD 102 and PD 112, to enable receivers of the communications, such as PD 112 and SD 102, to be able to discern the senders of the communications.

Figure 2:
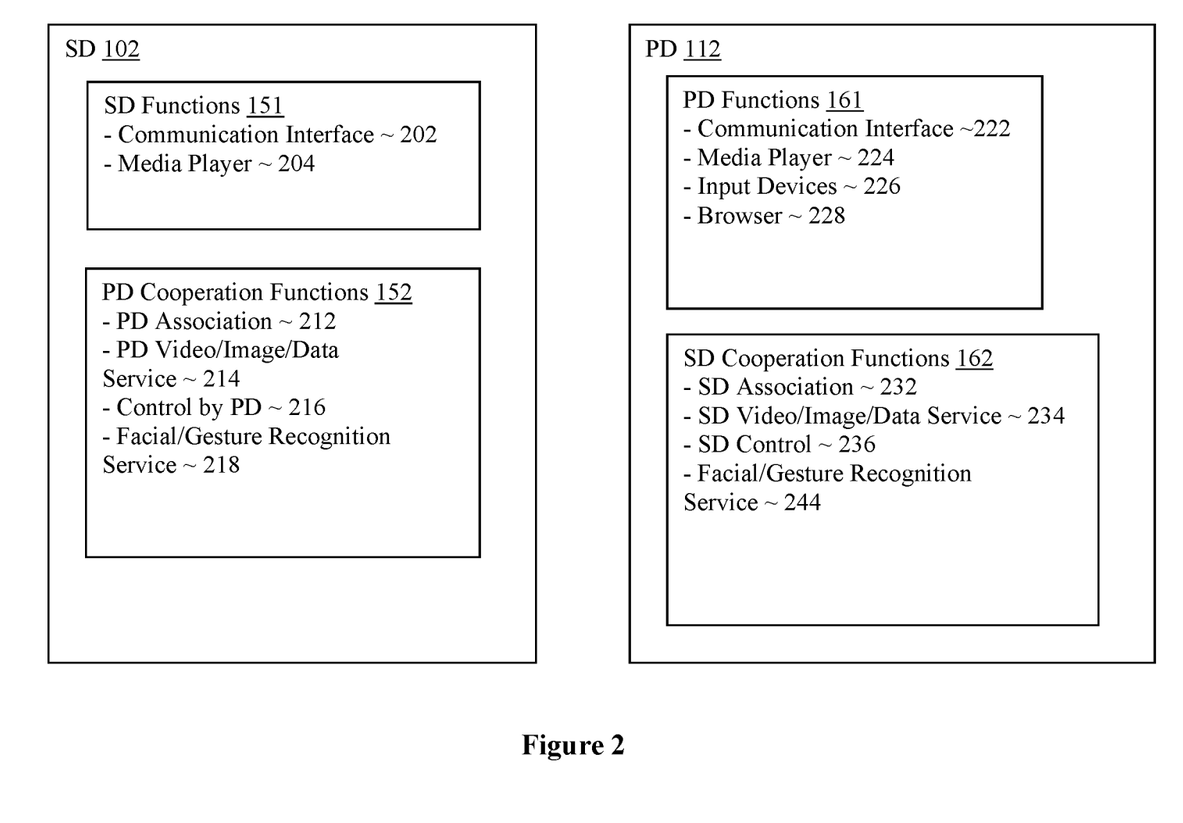
FIG. 2 illustrates one example each of a shared device and a personal device in further detail.

FIG. 2 illustrates one example each of SD 102 and PD 112 in further detail, in accordance with various embodiments. As shown and described earlier, SD 102 may include SD functions 151 and PD cooperation functions 152, whereas PD 112 may include PD functions 161 and SD cooperation functions 162.

In various embodiments, SD functions 151 may include one or more communication interfaces 202, having respective transceivers, and media player 204, having one or more A/V decoders. Communication interfaces 202, having respective transceivers, may include, but are not limited to, a communication interface configured to receive A/V content from a television programming broadcaster, a cable operator, or a satellite programming provider, a communication interface configured to receive A/V content from a DVR, CD/DVD/Blu-ray player or a VCR, a communication interface configured to communicate with access point 110, and/or a communication interface configured to directly communicate with PD 112. Media player 204, having one or more A/V decoders, may be configured to decode and render various A/V content streams. The various A/V decoders may be configured to decode A/V content streams of various formats and/or encoding schemes.

In various embodiments, PD cooperation functions 152 may include a PD registration/association function 212, a PD video/image/data service 214 and a control by PD function 216. Further, PD cooperation functions 152 may include facial/gesture recognition function 218.

PD registration/association function 212 may be configured to register SD 102 with a PD 112 or associate PD 112 with SD 102. In various embodiments, registration/association function 212 may be configured to register/associate SD 102 with a PD 112 by exchanging messages with identification and/or configurations. In alternate embodiments, registration/association function 212 may be configured to register/associate SD 102 with a PD 112, in cooperation with facial/gesture recognition service 218, using a facial recognition service. In various embodiments, registration/association function 212 may be configured to maintain a map of the PD 112 with whom SD 102 is registered and/or associated. For various set-top box 104 and television 106 embodiments, where television 106 includes a PIP feature with one or more PIP 108, PD registration/association function 212 may be configured to register SD 102 with a PD 112 or associate SD 102 with a PD 112, at a PIP granularity level, to enable video streams rendered in the main picture and the PIP 108 to be logically associated with different PD 112. Further, PD registration/association function 212 may be configured to maintain the earlier described SD 102 to PD 112 map at a PIP granularity level. In various embodiments, PD registration/association function 212 may be further configured to maintain the map to include a current status of the user of the PD 112, e.g., whether the user is among the current users of SD 102. PD registration/association function 212 may be configured to update the status as the user becomes a current user of SD 102 (or one of the current users of SD 102), or ceases to be a current user of SD 102.

PD video/image/data service 214 may be configured to enable SD 102 to exchange, with PD 112, video, image and/or data associated with a video stream being rendered on SD 102. The video, image and/or data associated with a video stream, provided to PD 112 by SD 102, may be captured by SD 102, or obtained from another third party. In particular, PD video/image/data service 214 may be configured to capture an image or a video clip from a video stream being rendered on SD 102 or to capture an image from a camera of SD 102. In addition to providing to PD 112, the captured image or video clip may be stored and/or provided to PD 112.

Further, PD video/image/data service 214 may be configured to provide the captured image or video clip from a video stream to a cloud computing server to identify the video stream, and/or to obtain metadata associated with the video stream. The metadata may be provided by the video stream creator/owner, distributor or associated advertisers. The metadata associated with the video stream may also be stored or provided to PD 112. Further, the viewing history may be stored on SD 102.

Control by PD function 216 may be configured to accept controls from PD 112, and in response, control SD 102 accordingly, including, but is not limited to, controlling capturing of an image from a video stream being rendered on SD 102, or controlling rendering of a video stream on SD 102, such as stopping, pausing, forwarding or rewinding the video stream. Control by PD function 216 may also be configured to accept controls from PD 112, to adjust the rendering of a 3DTV video stream on SD 102, to control the quality of the 3DTV images rendered. Controls may include control of relative depth between the component images, control to reduce color and/or sharpness distortion of edges.

Facial/Gesture Recognition service 218 may be configured to provide a number of facial recognition and/or gesture recognition services. Facial recognition services may include recognition of faces in a picture, including age, gender, ethnicity, and so forth. Facial recognition services may further include recognition of facial expressions, e.g., approved, disapproved, interested, disinterested, happy, sad, angry or at peace. Facial recognition may be based on one or more facial or biometric features. Gesture recognition services may include recognition of a number of hand gestures, including but are not limited to, a thumb up hand gesture denoting "like," a thumb down hand gesture denoting "dislike," two fingers moving away from each other denoting "enlarge," two fingers moving towards each other denoting "shrink," two fingers or two hands crossing each other denoting "swap."

In various embodiments, PD registration/association function 212 may be configured to cooperate with facial/gesture recognition function 218 to effectuate registration of SD 102 or logical units of SD 102 (e.g., PIP 108, if SD 102 includes television 106 with PIP 108) with various PD 112, or association of various PD 112.

The term "association" as used herein refers to a relationship between two entities, e.g., SD 102 and PD 112, whereas the term "registration" as used herein refers to an action of one entity with another entity, e.g., an "action" for the purpose of forming an "association" between the entities. In other words, the present disclosure anticipates an "association" between SD 102 and PD 112 may be formed unilaterally or bilaterally. For example, SD 102, by virtue of its knowledge of a particular PD 112, such as its identification, may unilaterally consider the particular PD 112 be associated with the SD 102, without itself registering with the particular PD 112 or requiring the particular PD 112 to register with itself. On the other hand, SD 102 and/or PD 112 may explicitly identify themselves to each other ("register") to form the association.

Continue to refer to FIG. 2, in various embodiments, PD functions 161 may include one or more communication interfaces 222, having respective transceivers, media player 224, having one or more A/V decoders, input devices 226, and browser 228. Communication interfaces 222 may include a communication interface configured to communicate with a cellular communication service, a communication interface configured to communicate with access point 110, and/or a communication interface configured to directly communicate with SD 102. Media player 224, having one or more A/V decoders, may be configured to decode and render various A/V content streams. The various A/V decoders may be configured to decode A/V content streams of various formats and/or encoding schemes.

Input devices 226 may be configured to enable a user of PD 112 to provide various user inputs. Input devices 226 may include a keyboard (real or virtual) to enable a user to provide textual input, and/or a cursor control device, such as a touch pad, a track ball, and so forth. In various embodiments, input devices 226 include video and/or touch sensitive screen to enable a user to provide a gesture input. Gesture inputs may include the same or different hand gesture described earlier with respect to facial/gesture recognition service 218.

Browser 228 may be configured to enable a user of PD 112 to access a remote search service, an e-commerce site or a social network on the Internet. Examples of a search service may include Google®, Bing® and so forth. An e-commerce site may include Amazon, Best Buy and so forth. Social network may include Facebook®, MySpace®, and so forth. Browser 228 may also be configured to enable the user of PD 112 to participate in a Special Interest Group (SIG) associated with the program of a video stream being rendered on SD 102. Such SIG may be pre-formed or dynamically formed based on current content being delivered by a content provider. Such SIG may also be geographically divided, or by PD device types.

In various embodiments, SD cooperation functions 162 may include a SD registration function 232, a SD video/data service 234, and a SD control function 236. SD cooperation functions 162 may further include facial/gesture recognition service 244.

SD registration/association function 232, similar to PD registration/association function 212 of SD 102, may be configured to register PD 112 with a SD 102, or associate SD 102 with PD 112. For various set-top box 104 and television 106 embodiments, where television 106 includes a PIP feature, SD registration function 232 may be configured to register PD 112 with a SD 102, or associate SD 102 with PD 112, at a PIP granularity level, to enable video streams rendered in the main picture and the PIP 108 to be independently associated with the same or different PD 112.

SD video/image/data service 234, similar to PD video/image/data service 214 of SD 102, may be configured to exchange with SD 102, video, image and/or data associated with a video stream being rendered on SD 102. Similarly, SD video/image/data service 234 may be configured to send and/or accept video, image and/or data to/from a cloud computing server. SD video/image/data service 234 may be configured to cooperate with browser 228 to effectuate the send and accept of video, image and/or data to/from a cloud computing server.

SD Control 236 may be configured to provide controls to SD 102 to control SD 102. As described earlier, with respect to Control by PD 216 of SD 102, controls may include, but are not limited to, enlarging or shrinking a PIP 108, swapping video streams between the main picture and a PIP 108, stop, pause, fast forward or rewind a video stream. SD Control 236 may also be configured to provide controls to SD 102 to adjust the rendering of a 3DTV video stream on to control SD 102, to control its quality. Further, SD Control 236 may be configured to provide automatic video stream switching during commercials, and automatic switch backs, when the commercials are over. SD Control 236 may also be configured to provide controls to SD 102, to adjust the rendering of a 3DTV video stream on SD 102, to control the quality of the 3DTV images rendered. Controls may include control of relative depth between the component images, control to reduce color and/or sharpness distortion of edges.

Before continuing with further description, it should be noted while embodiments of SD 102 and PD 112 were illustrated in FIG. 2, with both devices respectively having facial/gesture recognition services 218 and 244, other embodiments may be practiced with only one or none of SD 102 and PD 112 having facial/gesture recognition service. Similarly, while for ease of understanding, video/image/data services 214 and 234, and facial/gesture recognition services 218 and 244 have been described as combined services, in alternate embodiments, the present disclosure may be practiced with one or both of these services sub-divided into separate services, e.g., video/image/data service sub-divided into separate video, image and data services, or facial/gesture recognition service sub-divided into separate facial, and gesture recognition services.

Accordingly, on registration or association, PD cooperation function 152 and SD cooperation function 162 may cooperate to provide personalized user function by a user of PD 112. For example, video/image/data services 214 and 234 may cooperate to enable an image frame from a video stream being rendered on SD 102 (e.g., in a main picture or a PIP 108 of a television) to be provided from SD 102 to PD 112. The image frame may be provided in response to a request by a user of PD 112 for cooperative user functions. The image frame may be an image frame rendered on SD 102 at substantially the time the request was made at PD 112. The time of request may be conveyed to service 214 by service 234.

As another example, video/image/data service 234 may also cooperate with browser 228 to enable a received image frame to be provided to a search service to perform a search, based at least in part on the received image frame. Similarly, video/image/data service 234 may also cooperate with browser 228 to enable a user of PD 112 to engage in an e-commerce transaction with an e-commerce site, where the e-commerce transaction is at least partially a result of the received image frame. More specifically, on seeing an item of interest in a video stream being rendered on SD 102, a user of PD 112 may request an image frame, and cause an image frame having the item be provided to PD 112, using services 214 and 234, as described earlier. On receipt of the image frame, and after highlighted the item of interest, the user may further cause a search of the item be performed, using browser 228. On locating the item for sale on an e-commerce site, the user may engage the e-commerce site in an e-commerce transaction to purchase the item.

Figure 3:
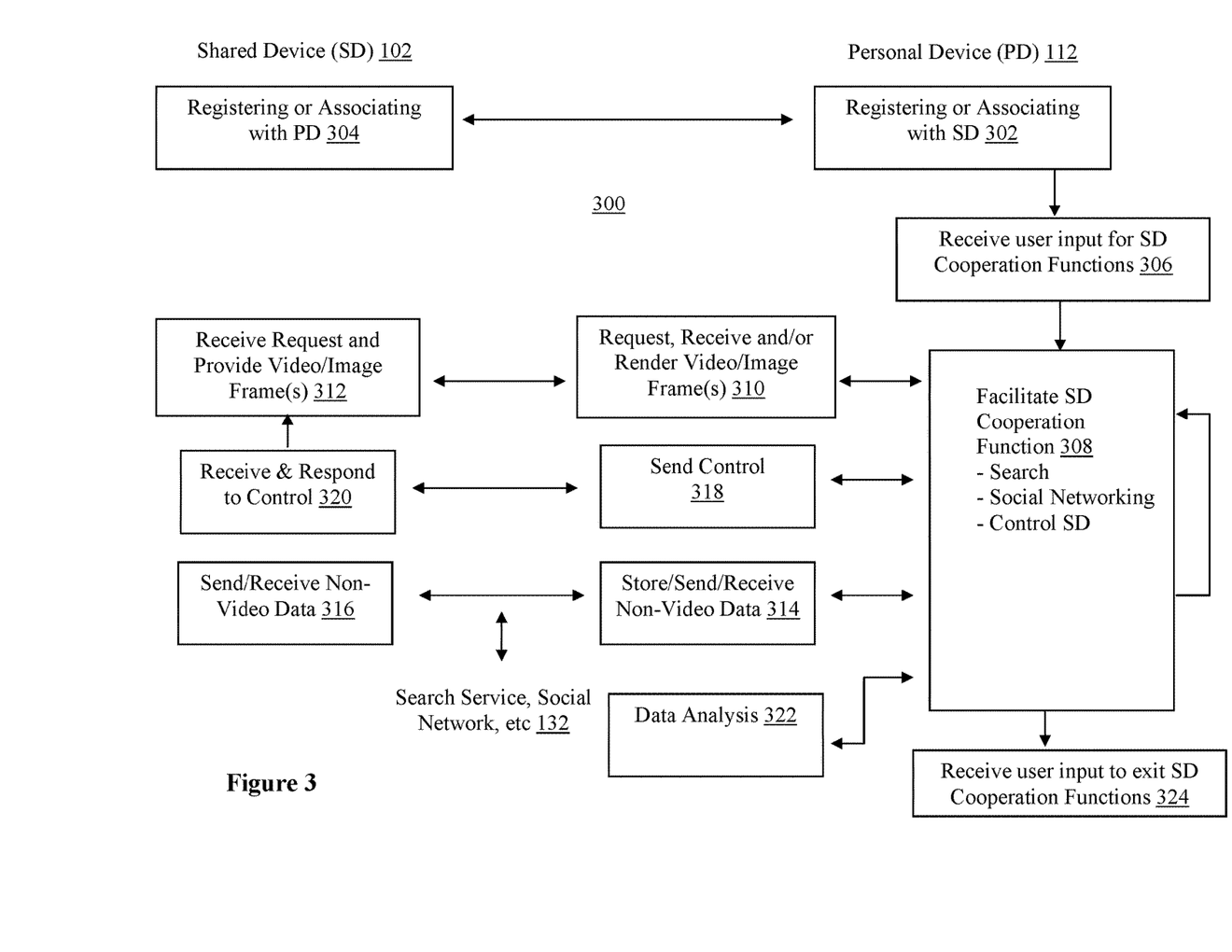
FIG. 3 illustrates an example method of cooperative provision of personalized user functions using shared and personal devices.

FIG. 3 illustrates an example method of cooperative provision of personalized user functions using shared and personal devices, in accordance with various embodiments. As illustrated, method 300 may begin at block 302 and/or 304 with SD 102 and/or PD 112 register or associate with each other, to be described more fully below, with references to FIG. 4. In various embodiments, method 300 may be practiced with PD 112 registers itself with SD 102 or otherwise associates SD 102 to itself. In other embodiments, method 300 may be practiced with SD 102 registers itself with PD 112 or otherwise associates PD 112 with itself. In still other embodiments, method 300 may be practiced with SD 102 and PD 112 register or otherwise associate themselves with each other.

In various embodiments, SD 102 and PD 112 may also exchange configuration information, as part of the registration process, to facilitate subsequent communications. For example, SD 102 and PD 112 may exchange their respective capability information, such as, processing power, encoding/decoding schemes supported, messaging protocols supported, and so forth. In various embodiments, SD 102 and/or PD 112 may also be configured, as part of the registration process, to cause required software and/or updates to be pushed to and/or installed on the other device.

On registration or association, method 300 may proceed to block 306 where PD 112 may receive an indication or a selection from a user of PD 112 to have SD 102 and PD 112 cooperate to provide personalized user functions. From block 306, method 300 may proceed to block 308, where PD 112 may cooperate with SD 102 to facilitate cooperative provision of personalized user functions to the user.

From block 308, method 300 may proceed to block 310, then to block 312, and then back to block 310, where an image frame of a video stream being rendered on SD 102 may be requested, provided to, and rendered on PD 112. As described earlier, in various embodiments, the image frame may be an image frame rendered on SD 102 at substantially the time the request was made on PD 112. From block 310, method 300 may proceed back to block 308, where the user may perform various functions using the image frame, e.g., uploading the image frame to a social network or a cloud computing server, conduct a search based on the image frame or objects within, or conduct e-commerce transactions with an e-commerce site, resulted at least in part because of the image frame or objects within.

Thereafter, the above described operations may be repeated, in response to various further user inputs. Eventually, method 300 may proceed from block 308 to block 324, wherein a user input to exit the cooperative provision of user function may be received. On receipt of such input, method 300 may terminate.

In various embodiments, in addition to cooperative to provision of personalized user functions, method 300 may also include SD 102 and PD 112 cooperate to facilitating personalized video content consumption by the user of PD 112. Examples of such personalized video content consumption may include control of SD 102 from PD 112, via blocks 318 and 320. Further, SD 102 and PD 112 may cooperate to support annotation of images and/or objects within the images associated with video content consumed using PD 112, storing the annotation back on SD 102, and subsequently retrieving the stored annotation, via blocks 314 and 316. Additionally, SD 102 and PD 112 may also cooperate to support annotating the obtained image frames and/or objects within, analysis of historical video content consumption, user actions associated with the video content consumed, interactions/cooperation between SD 102 and PD 112, and provide personalized recommendations for other content consumption or user actions, via block 322. These further support and features are subjects of the Related Applications. Refer to the Related Applications for further detail.

Figure 4:
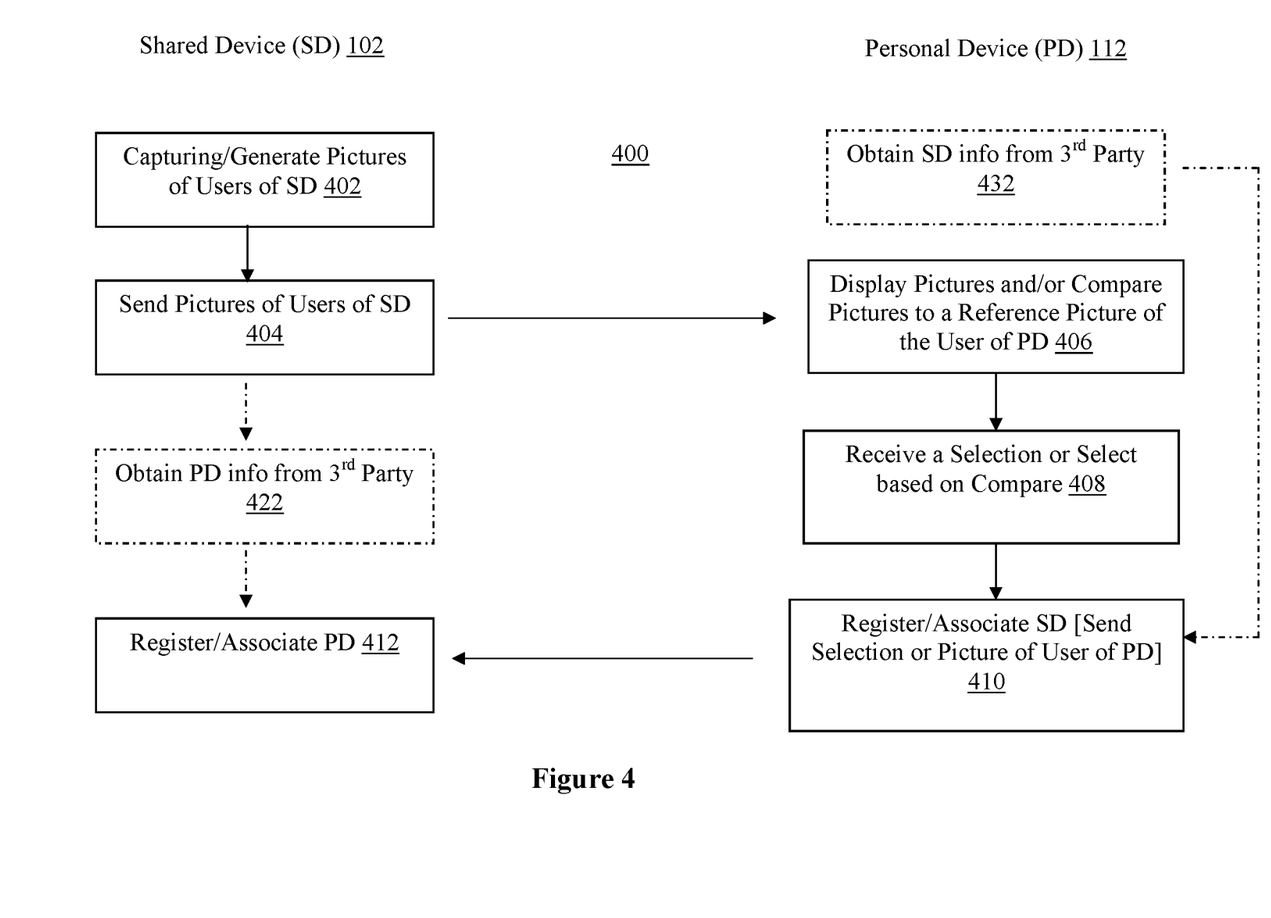
FIG. 4 illustrates various examples of facial recognition based methods of registration and/or association between the shared and personal devices.

FIG. 4 illustrates various examples of facial recognition based methods of registration and/or association between the shared and personal devices, in accordance with various embodiments. As illustrated, method 400 may begin e.g., at block 402, with SD 102 (equipped with an image capturing device, such as, a camera) capturing pictures of its users. In various embodiments, SD 102 may capture pictures of its users by capturing a picture of the space in front SD 102, and then analyze the picture (using e.g., facial/gesture recognition service 218) for faces of users. On identifying new user faces, SD 102 (using e.g. registration/association function 212) may generate pictures of the new users. SD 102 may perform the capture and generate operations periodically, e.g., on power on, and therefore periodically on a time basis or on an event driven basis, e.g. on changing of the video stream being rendered or on changing of the genre of the video stream being rendered.

From block 402, method 400 may proceed to block 404, where SD 102, in response to detection of PD 112 or contact by PD 112, may send pictures of users of SD 102 to PD 112. From block 404, method 400 may proceed to block 406, where PD 112, for certain "manual" embodiments, may display the received pictures for a user of PD 112 to confirm whether one of the received pictures is a picture of the user of PD 112. Alternatively, PD 112, for certain "automated" embodiments, using e.g., facial/gesture recognition service 244, may compare the received pictures with a reference picture of the user of PD 112. The reference picture of the user of PD 112 may be previously provided to PD 112, or captured by PD 112 (for embodiments equipped with an image capture device, such as, a camera).

From block 406, method 400 may proceed to block 408, where PD 112, for the "manual" embodiments, may receive a selection of one of the received pictures from the user of PD 112, indicating the selected picture of the user of SD 102 corresponds to the user of PD 112. For the 'automated" embodiments, PD 112 may select one of the received pictures that substantially match the reference picture.

From block 408, method 400 may proceed to block 410, where PD 112 may associate itself with SD 102. In associating itself with SD 102, PD 112 may send the selection info (provided by the user or by the comparison operation) to SD 102 to register itself with SD 102 (or a logical unit of SD 102, such as, a PIP 108 of a television 106 of SD 102).

From block 410, method 400 may proceed to block 412, where SD 102 may respond to the provided selection, and associate itself with PD 112, including, associating the user of the selected picture with PD 112. In various embodiments, where PD 112 also maintains a map of the various SD 102 it is associated with (such as a SD 102 at the primary residence, a SD 102 at the beach house, and so forth), in response, SD 102 may register itself with PD 112.

In alternate embodiments, from block 404, method 400 may proceed to block 422 instead, where at block 422, SD 102 may contact an external source, e.g., a cloud computing server, to obtain identification and/or configuration information of PD 112, using the captured/generated pictures of its users. From block 422, method 400 may proceed to block 412, where SD 102 may associate itself with all PD 112 it was able to obtain at least identification information, including, respectively associating the user pictures with the PD 112 it was able to obtain identification information based on the user pictures.

In alternate embodiments, method 400 may also begin at block 432 instead, with PD 112, contacting an external source, e.g., a cloud computing server, to obtain identification and/or configuration information of SD 102. If successful, from block 432, PD 112 may proceed to block 410, where PD 112 associates SD 102 to itself. At block 410, PD 112, may register itself with SD 102. From block 410, method 400 may proceed to block 412, as described earlier.

Figure 5:
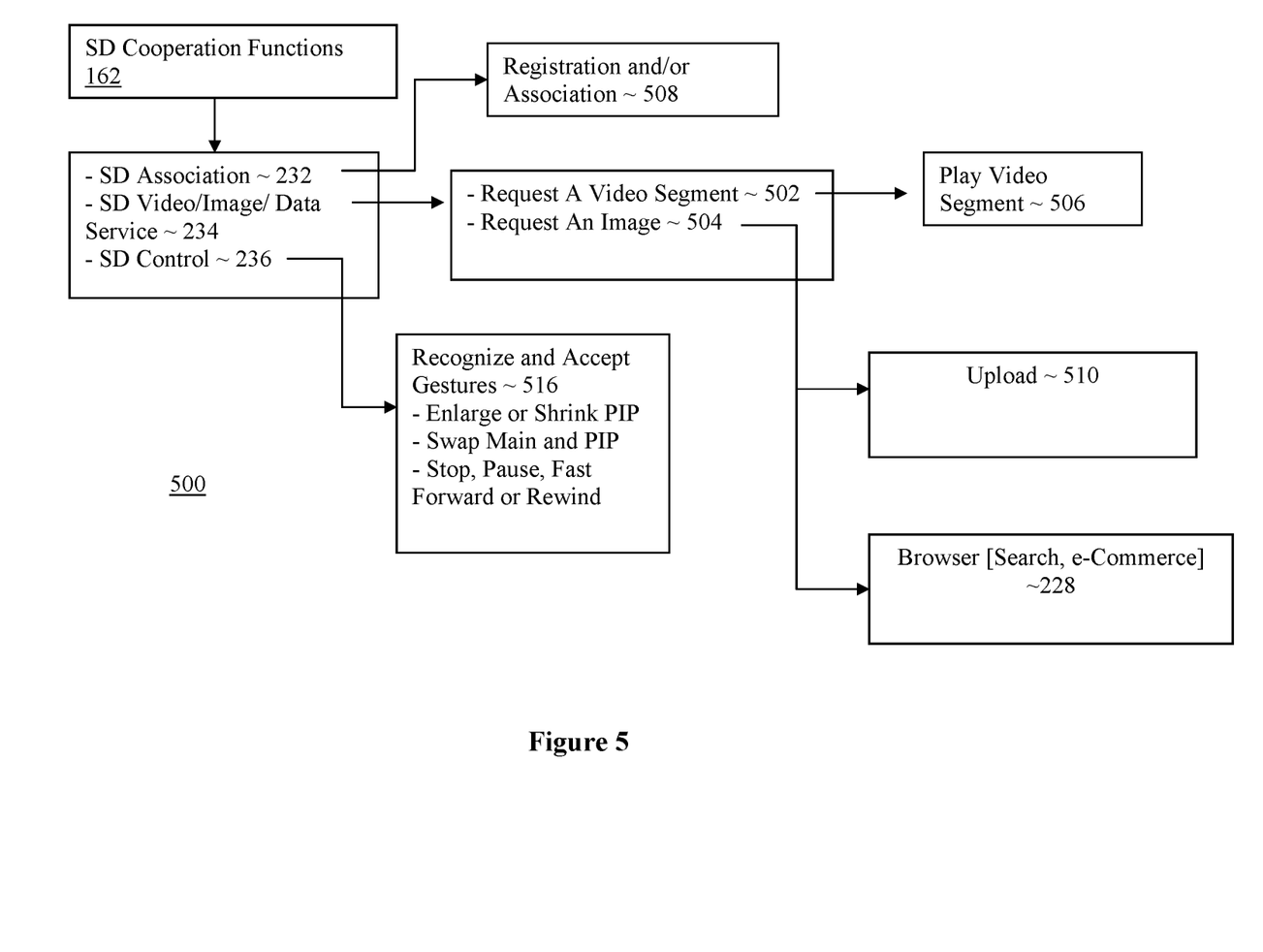
FIG. 5 illustrates a user view of cooperative provision of personalized user functions using shared and personal devices.

FIG. 5 illustrates a user view of cooperative personalized user function provision by shared and personal devices, in accordance with various embodiments of the present disclosure. As illustrated, initially, the example cooperative personalized user function provision 500 may present the user of PD 112 with the option, via, e.g., an icon displayed on PD 112, to launch SD cooperative functions 162. In response to the selection of the option, the user of PD 112 may be presented with the options of selecting SD registration/association function 232, or SD video/image/data service 234. In various embodiments, the user of PD 112 may be further presented with the option of SD Control 236.

On selection of SD registration/association function 232, various registration and/or association operations 508, as earlier described, may be performed. On selection of the option of SD video/image/data service, the user of PD 112 may be presented with the options of requesting 502 a video segment of a video stream being rendered on SD 102, or requesting 504 an image frame of a video stream being rendered on SD 102. On selection of the option to request 502 a video segment of a video stream being rendered on SD 102, and receive, in response, the video segment, PD 112 (using e.g. media player 224), after making the request, the user of PD 112 may be presented with the option of playing/rendering 506 the video segment. On selection of the option to request 504 an image frame of a video stream being rendered on SD 102, and receive, in response, the image frame, after making the request, the user of PD 112 may be presented with the option of upload 510 to upload the image to a social network or a cloud computing server, or browser 228 to submit a search to an online search service, subsequently to conduct an e-commerce transaction with an e-commerce site, or to participate in a SIG.

Additionally, in embodiments where the option of SD Control function 236 is provided, the user of PD 112 may be provided with the gesture recognition function 516 to receive and accept gestures to control SD 102, e.g., to enlarge or shrink a PIP 108, to swap two video streams between the main picture and a PIP 108, or to stop, pause, fast forward or rewind a video stream being rendered on SD 102. These features are the subjects of the Related Applications. For further details, refer to the Related Applications.

Figure 6:
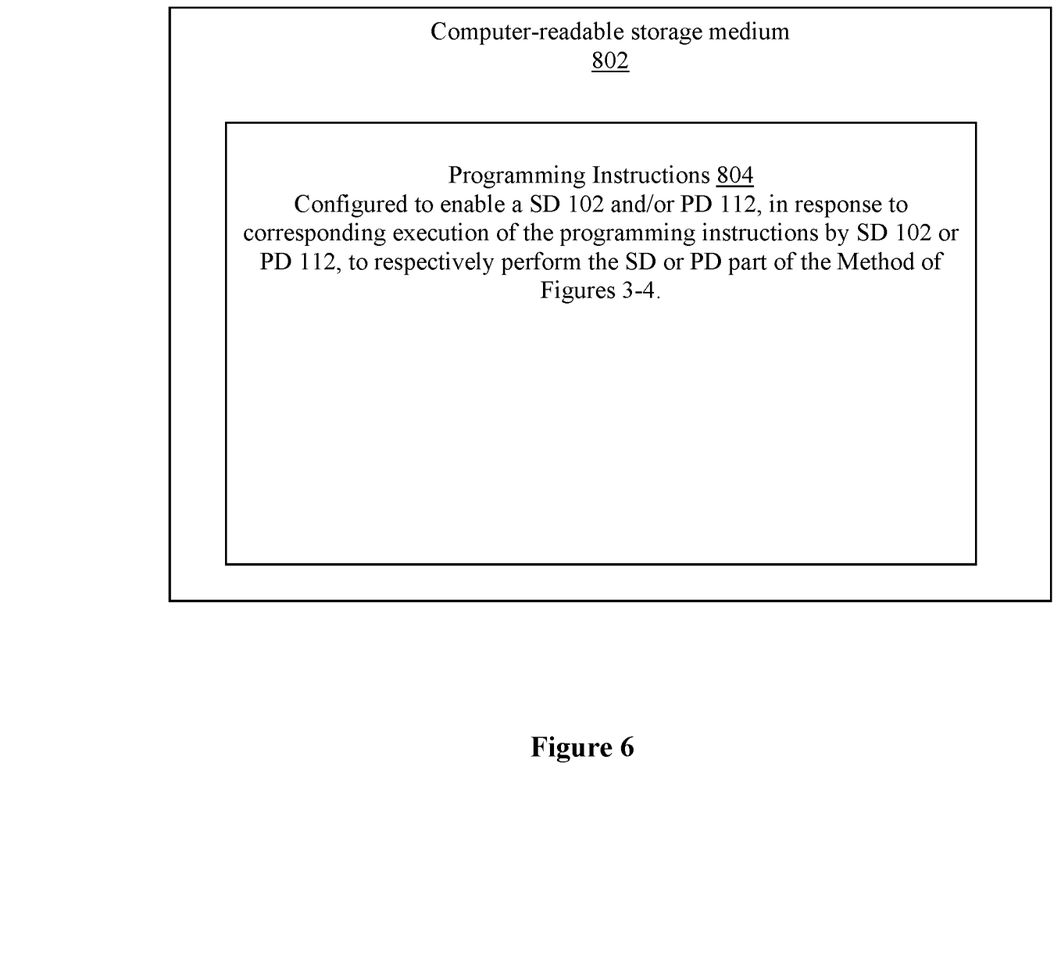
FIG. 6 illustrates a non-transitory computer-readable storage medium having instructions configured to practice all or selected aspects of the methods of FIGS. 3-4.

FIG. 6 illustrates a non-transitory computer-readable storage medium, in accordance with various embodiments of the present disclosure. As illustrated, non-transitory computer-readable storage medium 802 may include a number of programming instructions 804. Programming instructions 804 may be configured to enable a SD 102 or a PD 112, in response to corresponding execution of the programming instructions by SD 102 or PD 112, to perform operations of the SD or PD portion of methods 300-400 earlier described with references to FIGS. 3 and 4. In alternate embodiments, the programming instructions may be disposed in two or more storage medium instead.

Figure 7:
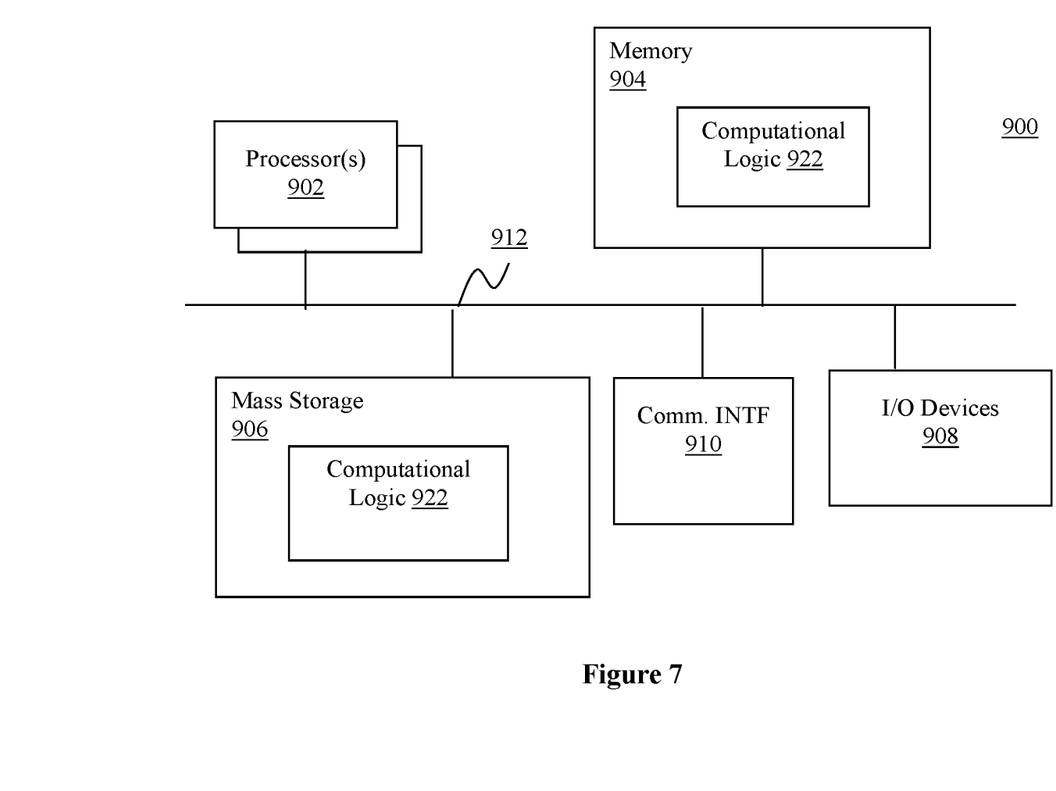
FIG. 7 illustrates an example computing environment suitable for use as a shared or personal device; all arranged in accordance with embodiments of the present disclosure.

FIG. 7 illustrates an example computer system suitable for use as a SD or a PD in accordance with various embodiments of the present disclosure. As shown, computing system 900 includes a number of processors or processor cores 902, and system memory 904. For the purpose of this application, including the claims, the terms "processor" and "processor cores" may be considered synonymous, unless the context clearly requires otherwise. Additionally, computing system 900 includes mass storage devices 906 (such as diskette, hard drive, compact disc read only memory (CD-ROM) and so forth), input/output devices 908 (such as display, keyboard, cursor control, touch pad, camera, and so forth) and communication interfaces 910 (such as, WiFi, Bluetooth, 3G/4G network interface cards, modems and so forth). The elements are coupled to each other via system bus 912, which represents one or more buses. In the case of multiple buses, they are bridged by one or more bus bridges (not shown).

Each of these elements performs its conventional functions known in the art. In particular, system memory 904 and mass storage 906 may be employed to store a working copy and a permanent copy of the programming instructions implementing the SD or PD portion of methods 300-400 earlier described with references to FIGS. 3 and 4, that is PD cooperation function 152 or SD cooperation function 162, or portions thereof, herein collectively denoted as, computational logic 922. Computational logic 922 may further include programming instructions to practice or support SD functions 151 or PD functions 161, or portions thereof. The various components may be implemented by assembler instructions supported by processor(s) 902 or high-level languages, such as, for example, C, that can be compiled into such instructions.

The permanent copy of the programming instructions may be placed into mass storage 906 in the factory, or in the field, through, for example, a distribution medium (not shown), such as a compact disc (CD), or through communication interface 910 (from a distribution server (not shown)). That is, one or more distribution media having an implementation of computational logic 922 may be employed to distribute computational logic 922 to program various computing devices.

The constitution of these elements 902-912 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. An apparatus capable of being used in association with a television, a camera, a distribution server, at least one personal device, and at least one remote server, the apparatus being capable, when the apparatus is in operation, of communicating via an Internet network with the at least one remote server, the apparatus comprising:
   a box device for use in rendering, at least in part, streaming video content via the television, the streaming video content to be received by the box device from the at least one remote server via the Internet network, the box device comprising;
   at least one multi-core processor;
   mass storage to store program instructions that are capable of being executed, at least in part, by the at least one multi-core processor, the program instructions when executed, at least in part, by the at least one multi-core processor resulting in the box device being capable of performing operations comprising:
   performing user facial recognition-related processing, based at least in part, upon image data generated, at least in part, via image capture by the camera of an area that includes a current user of the box device, the user facial recognition-related processing being for use in identifying the current user of the box device from among a plurality of possible users of the box device;
   capturing, for upload via the at least one remote server to at least one social network, video clip data comprising at least a portion of the streaming video rendered via the television;

wherein:
   in the operation of the apparatus, the image data is capable of being used in association with user gesture processing and user facial expression analysis to be performed, at least in part, by the box device, the user gesture processing to be used to implement, at least in part, at least one command that is to be determined based, at least in part, upon at least one gesture input of the current user, the at least one gesture input to be provided, at least in part, via the at least one personal device for use in controlling, at least in part, the box device, the at least one gesture input being capable of corresponding to at least one user request for change in picture-in-picture display, the user facial expression analysis to be used to determine, at least in part, at least one facial expression of the current user;
   in the operation of the apparatus, the box device is capable of receiving, at least in part, the program instructions, via wireless communication, from the distribution server, for provision to the mass storage for execution, at least in part, by the at least one multi-core processor;
   in the operation of the apparatus, the box device is capable of being used in a device registration process that is to result in generation of an association mapping of the current user with the box device, the association mapping being for use in enabling logical association of video stream data with a sender of the video stream data, the video stream data to be rendered, via the box device, by the television, as a picture-in-picture;
   in the operation of the apparatus, the association mapping is capable of being updated after occurrence of at least one user status change to reflect whether the current user is no longer to be associated with the box device; and
   in the operation of the apparatus, the box device is capable of being used in storage and retrieval of annotated captured video stream image content.

2. The apparatus of claim 1, wherein:
the at least one remote server comprises a cloud computing server, social networking server, and/or e-commerce server;
the at least one facial expression comprises approved, disapproved, interested, disinterested, happy, sad, angry or at peace; and/or
the at least one gesture input comprises at least one hand gesture.

3. The apparatus of claim 2, wherein:
the at least one hand gesture comprises an enlarge gesture, a shrink gesture, a like gesture, a dislike gesture, or a swap gesture; and/or
the box device is capable of rendering via the television at least one picture-in-picture.

4. The apparatus of claim 3, wherein:
the box device is capable of changing size of the at least one picture-in-picture based at least in part upon user command;
the box device and the television comprise mutually separate devices that are to be coupled together;

the apparatus comprises the camera;
the plurality of possible users comprises certain users associated with a registration function of the box device; and/or
the wireless communication is via a wireless communication interface of the box device.

5. At least one computer-readable storage medium storing program instructions for execution by a box device, the box device being usable in association with a television, a camera, a distribution server, at least one personal device, and at least one remote server, the box device being usable in rendering, at least in part, when the box device is in operation, streaming video content via the television, the streaming video content to be received by the box device from the at least one remote server via an Internet network, the instructions when executed by the box device resulting in the box device being capable of performing operations comprising:
  performing user facial recognition-related processing, based at least in part, upon image data generated, at least in part, via image capture by the camera of an area that includes a current user of the box device, the user facial recognition-related processing being for use in identifying the current user of the box device from among a plurality of possible users of the box device;
  capturing, for upload via the at least one remote server to at least one social network, video clip data comprising at least a portion of the streaming video rendered via the television;
  wherein:
    in the operation of the box device, the image data is capable of being used in association with user gesture processing and user facial expression analysis to be performed, at least in part, by the box device, the user gesture processing to be used to implement at least in part at least one command that is to be determined based, at least in part, upon at least one gesture input of the current user, the at least one gesture input to be provided, at least in part, via the at least one personal device for use in controlling, at least in part, the box device, the at least one gesture input being capable of corresponding to at least one user request for change in picture-in-picture display the user facial expression analysis to be used to determine, at least in part, at least one facial expression of the current user;
    in the operation of the box device, the box device is capable of receiving, at least in part, the program instructions, via wireless communication, from the distribution server, for the execution by the box device;
    in the operation of the box device, the box device is capable of being used in a device registration process that is to result in generation of an association mapping of the current user with the box device, the association mapping being for use in enabling logical association of video stream data with a sender of the video stream data, the video stream data to be rendered, via the box device, by the television, as a picture-in-picture;
    in the operation of the box device, the association mapping is capable of being updated after occurrence of at least one user status change to reflect whether the current user is no longer to be associated with the box device; and
    in the operation of the box device, the box device is capable of being used in storage and retrieval of annotated captured video stream image content.

6. The at least one computer-readable storage medium of claim 5, wherein:
  the at least one remote server comprises a cloud computing server, social networking server, and/or e-commerce server;
  the at least one facial expression comprises approved, disapproved, interested, disinterested, happy, sad, angry or at peace; and/or
  the at least one gesture input comprises at least one hand gesture.

7. The at least one computer-readable storage medium of claim 6, wherein:
  the at least one hand gesture comprises an enlarge gesture, a shrink gesture, a like gesture, a dislike gesture, or a swap gesture; and/or
  the box device is capable of rendering via the television at least one picture-in-picture.

8. The at least one computer-readable storage medium of claim 7, wherein:
  the box device is capable of changing size of the at least one picture-in-picture based at least in part upon user command;
  the box device and the television comprise mutually separate devices that are to be coupled together;
  the plurality of possible users comprises certain users associated with a registration function of the box device; and/or
  the wireless communication is via a wireless communication interface of the box device.

9. A method implemented, at least in part, using a box device, the box device being usable in association with a television, a camera, distribution server, at least one personal device, and at least one remote server, the box device being usable in rendering, at least in part, when the box device is in operation, streaming video content via the television, the streaming video content to be received by the box device from the at least one remote server via an Internet network, the method comprising:
  performing, at least in part by the box device, user facial recognition-related processing, based at least in part, upon image data generated, at least in part, via image capture by the camera of an area that includes a current user of the box device, the user facial recognition-related processing being for use in identifying the current user of the box device from among a plurality of possible users of the box device;
  capturing, at least in part by the box device, for upload via the at least one remote server to at least one social network, video clip data comprising at least a portion of the streaming video rendered via the television;
  wherein:
    in the operation of the box device, the image data is capable of being used in association with user gesture processing and user facial expression analysis to be performed, at least in part, by the box device, the user gesture processing to be used to implement at least in part at least one command that is to be determined based, at least in part, upon at least one gesture input of the current user, the at least one gesture input to be provided, at least in part via the at least one personal device for use in controlling, at least in part, the box device, the at least one gesture input being capable of corresponding to at least one user request for change in picture-in-picture display the user facial expression analysis to be used to determine, at least in part, at least one facial expression of the current user;

in the operation of the box device, the box device is capable of receiving, at least in part, program instructions, via wireless communication, from the distribution server, for execution by the box device;

in the operation of the box device, the box device is capable of being used in a device registration process that is to result in generation of an association mapping of the current user with the box device, the association mapping being for use in enabling logical association of video stream data with a sender of the video stream data, the video stream data to be rendered, via the box device, by the television, as a picture-in-picture;

in the operation of the box device, the association mapping is capable of being updated after occurrence of at least one user status change to reflect whether the current user is no longer to be associated with the box device; and in the operation of the box device, the box device is capable of being used in storage and retrieval of annotated captured video stream image content.

10. The method of claim 9, wherein:

the at least one remote server comprises a cloud computing server, social networking server, and/or e-commerce server;

the at least one facial expression comprises approved, disapproved, interested, disinterested, happy, sad, angry or at peace; and/or the at least one gesture input comprises at least one hand gesture.

11. The method of claim 10, wherein:

the at least one hand gesture comprises an enlarge gesture, a shrink gesture, a like gesture, a dislike gesture, or a swap gesture; and/or the box device is capable of rendering via the television at least one picture-in-picture.

12. The method of claim 11, wherein:

the box device is capable of changing size of the at least one picture-in-picture based at least in part upon user command;

the box device and the television comprise mutually separate devices that are to be coupled together;

the plurality of possible users comprises certain users associated with a registration function of the box device; and/or the wireless communication is via a wireless communication interface of the box device.

13. An apparatus capable of being used in association with a television, a camera, a distribution server, at least one personal device, and at least one remote server, the apparatus being capable, when the apparatus is in operation, of communicating via an Internet network with the at least one remote server, the apparatus comprising:

a box device for use in rendering, at least in part, streaming video content via the television, the streaming video content to be received by the box device from the at least one remote server via the Internet network, the box device comprising;

means for performing user facial recognition-related processing, based at least in part, upon image data generated, at least in part, via image capture by the camera of an area that includes a current user of the box device, the user facial recognition-related processing being for use in identifying the current user of the box device from among a plurality of possible users of the box device;

means for capturing, for upload via the at least one remote server to at least one social network, video clip data comprising at least a portion of the streaming video rendered via the television;

wherein:

in the operation of the apparatus, the image data is capable of being used in association with user gesture processing and user facial expression analysis to be performed, at least in part, by the box device, the user gesture processing to be used to implement, at least in part, at least one command that is to be determined based, at least in part, upon at least one gesture input of the current user, the at least one gesture input to be provided, at least in part, via the at least one personal device for use in controlling, at least in part, the box device, the at least one gesture input being capable of corresponding to at least one user request for change in picture-in-picture display, the user facial expression analysis to be used to determine, at least in part, at least one facial expression of the current user;

in the operation of the apparatus, the box device is capable of receiving, at least in part, program instructions, via wireless communication, from the distribution server, for provision to storage means of the box device for execution by the box device;

in the operation of the apparatus, the box device is capable of being used in a device registration process that is to result in generation of an association mapping of the current user with the box device, the association mapping being for use in enabling logical association of video stream data with a sender of the video stream data, the video stream data to be rendered, via the box device, by the television, as a picture-in-picture;

in the operation of the apparatus, the association mapping is capable of being updated after occurrence of at least one user status change to reflect whether the current user is no longer to be associated with the box device; and in the operation of the apparatus, the box device is capable of being used in storage and retrieval of annotated captured video stream image content.

14. The apparatus of claim 13, wherein:

the at least one remote server comprises a cloud computing server, social networking server, and/or e-commerce server;

the at least one facial expression comprises approved, disapproved, interested, disinterested, happy, sad, angry or at peace; and/or the at least one gesture input comprises at least one hand gesture.

15. The apparatus of claim 14, wherein:

the at least one hand gesture comprises an enlarge gesture, a shrink gesture, a like gesture, a dislike gesture, or a swap gesture; and/or the box device is capable of rendering via the television at least one picture-in-picture.

16. The apparatus of claim 15, wherein:

the box device is capable of changing size of the at least one picture-in-picture based at least in part upon user command;

the box device and the television comprise mutually separate devices that are to be coupled together;

the apparatus comprises the camera;
the plurality of possible users comprises certain users associated with a registration function of the box device; and/or
the wireless communication is via a wireless communication interface of the box device.

17. An apparatus capable of being used in association with a television, a camera, a distribution server, one or more personal devices, and one or more remote servers, the apparatus being capable, when the apparatus is in operation, of communicating via an Internet network with the one or more remote servers, the apparatus comprising:
a box device for use in rendering, at least in part, streaming video content via the television, the streaming video content to be received by the box device from the one or more remote servers via the Internet network, the box device comprising;
one or more multi-core processors;
mass storage to store program instructions that are capable of being executed, at least in part, by one or more multi-core processors, the program instructions when executed, at least in part, by the one or more multi-core processors resulting in the box device being capable of performing operations comprising:
performing user facial recognition-related processing based upon image data generated, at least in part, via image capture by the camera of an area that includes a current user of the box device, the user facial recognition-related processing being for use in identifying the current user of the box device from among a plurality of possible users of the box device;
capturing, for upload via the one or more remote servers to one or more social networks, video clip data comprising at least a portion of the streaming video rendered via the television;
wherein:
in the operation of the apparatus, the image data is capable of being used in user gesture processing and user facial expression analysis to be performed, at least in part, by the box device, the user gesture processing to be used to implement one or more commands that are to be determined based upon one or more gesture inputs of the current user, the one or more gesture inputs to be provided via the one or more personal device for use in controlling the box device, the one or more gesture inputs being capable of corresponding to one or more user requests for change in picture-in-picture display, the user facial expression analysis to be used to determine one or more facial expressions of the current user;
in the operation of the apparatus, the box device is capable of receiving, at least in part, the program instructions, via wireless communication, from the distribution server, for provision to the mass storage for execution, at least in part, by the one or more multicore multi-core processors;
in the operation of the apparatus, the box device is capable of being used in a device registration process that is to result in generation of an association mapping of the current user with the box device, the association mapping being for use in enabling logical association of video stream data with a sender of the video stream data, the video stream data to be rendered, via the box device, by the television, as a picture-in-picture;
in the operation of the apparatus, the association mapping is capable of being updated after occurrence of at least one user status change to reflect whether the current user is no longer to be associated with the box device; and
in the operation of the apparatus, the box device is capable of being used in storage and retrieval of annotated captured video stream image content.

18. The apparatus of claim 17, wherein:
the one or more remote servers comprise a cloud computing server, social networking server, and/or e-commerce server;
the one or more facial expressions comprise approved, disapproved, interested, disinterested, happy, sad, angry or at peace; and/or
the one or more gesture inputs comprise one or more hand gestures.

19. The apparatus of claim 18, wherein:
the one or more hand gestures comprise an enlarge gesture, a shrink gesture, a like gesture, a dislike gesture, or a swap gesture; and/or
the box device is capable of rendering via the television one or more pictures-in-picture.

20. The apparatus of claim 19, wherein:
the box device is capable of changing size of the one or more pictures-in-picture based upon user command;
the box device and the television comprise mutually separate devices that are to be coupled together;
the apparatus comprises the camera;
the plurality of possible users comprises certain users associated with a registration function of the box device; and/or
the wireless communication is via a wireless communication interface of the box device.

* * * * *